United States Patent Office 2,957,923
Patented Oct. 25, 1960

2,957,923

PRODUCTION OF CHLORETHYLENES

Harry B. Copelin and Frederick R. Pence, Niagara Falls, N.Y., assignors to E. I. du Pont de Nemours and Company, Wilmington, Del., a corporation of Delaware No Drawing. Filed Aug. 15, 1958, Ser. No. 755,150

13 Claims. (Cl. 260—654)

This invention relates to an improved process for the production of chlorinated ethylenes by heating chlorethanes either alone or in the presence of chlorine. It is particularly related to the preparation of trichlorethylene and perchlorethylene from tetrachlorethane.

The preparation of chlorinated ethylenes by thermal pyrolysis of chlorethanes is old and well known to the art. Furthermore, the production of perchlorethylene by heating a mixture of tetrachlorethane and chlorine alone or in the presence of a catalyst was patented by Basel and Schaeffer in 1938, U.S. Patent 2,139,219. Perchlorethylene is produced by the stoichiometrical reaction of one mol of tetrachlorethane with one mol of chlorine as indicated by the equation $$C_2H_2Cl_4 + Cl_2 = C_2Cl_4 + 2HCl$$

Basel and Schaeffer also disclosed the simultaneous production of trichlorethylene and perchlorethylene by heating tetrachlorethane with less than one molecular equivalent of chlorine. In these processes, the chlorethane containing reaction mixture is passed through heated or catalytic reactors in the vapor state followed by condensation and refining of the chlorinated products.

The efficiency of these chlorethylene processes is reduced by the formation of high boiling reaction products and incomplete utilization of chlorine when this is added as a raw material. Catalysts tend to improve reaction efficiency but require regeneration and renewal from time to time with consequent expenditures in materials and labor. Incomplete utilization of chlorine is particularly undesirable since it contaminates the by-product hydrogen chloride and limits its utility. Installation of a special purification step to remove chlorine from this material is undesirable since it adds appreciably to its cost.

One of the objects of this invention is to reduce the formation of high boiling by-products. Another object is the production of hydrogen chloride of improved purity for use in the production of other products. A further objective is a novel continuous process for the production of trichlorethylene and/or perchlorethylene from tetrachlorethane.

These objects are attained by a procedure in which the vapors of tetrachlorethane alone or in combination with up to about one mole of chlorine per mole of tetrachlorethane are passed sequentially through a heated, open-tube reaction zone followed by an unheated zone, the ratio of the volume of the unheated zone to the heated zone being at least about two to one. (By the term "open-tube" is meant a heated tube that is free of packing or added catalyst.) However, a ratio of about 10:1 or greater is preferred in some instances. Passage through the heated zone is always carried out in the absence of added catalysts. However, the unheated zone may, in some instances, be packed with metal particles, such as stainless steel or "Inconel," cracked porcelain, charcoal, activated carbon or various chlorination catalysts. When this is done a volume ratio of unheated to heated zone of around 2 to 1 is usually preferred.

The efficiency of the conversion process is also improved when a portion of crude reaction product generally equivalent to not over about 25% of the tetrachlorethane feed is combined with the vapors passing to the reaction zone. This may be done by adding crude product to the liquid tetrachlorethane feed prior to vaporization. This is particularly desirable when chlorine is charged with tetrachlorethane to produce perchlorethylene and efficient consumption of chlorine is desired to avoid contamination of by-product hydrogen chloride. A preferred procedure is to recycle the high boiling portion of crude product, principally pentachlorethane as obtained when the crude is refined by fractional distillation of chlorethylene products. In general, the concentration of pentachlorethane in the crude product has been discovered to remain approximately constant for a given set of reaction conditions and this concentration has been found to remain approximately unaltered if the pentachlorethane is separated from the crude product and recycled. This reduces the net by-product pentachlorethane to about zero, the non-recycled products consisting of a high yield of trichlorethylene and perchlorethylene. In general, the crude recycle pentachlorethane is equivalent to about 10-20% of the tetrachlorethane charged.

The chlorethylene processes of this invention are substantially endothermic being concerned principally with the production of trichlorethylene or mixtures of trichlorethylene and perchlorethylene in which the weight ratio of trichlorethylene to perchlorethylene ranges from about 6 to 1.5 and is preferably about 1.5. These ratios are obtained when the chlorine charged is equivalent to from 5 to 15% of the weight of tetrachlorethane.

The primary reaction zone must be raised to a temperature that will initiate the desired reactions but is insufficient to decompose the reaction products. It has been found that to achieve this, the primary reaction zone must be heated sufficiently to maintain an effluent temperature in the range 350° to 525° C. Trichlorethylene and perchlorethylene undergo decomposition if heated at temperatures above 525° C. The minimum temperature to initiate the process of this invention in the absence of added catalysts is about 350° C. Yields of the desired products increase as the temperature is raised until a maximum is obtained and then fall off. Depending on the rate at which a given feed composition is passed through the reaction zone, the optimum temperature may be readily found in the 350° to 525° C. reaction range. The temperature of the gases leaving the unheated secondary reaction zone is lower than the temperature at which they leave the heated zone. This drop in temperature may be varied by controlled use of thermal insulation on the secondary zone.

The two zones may be made up of separate reactors connected by a conduit. In a preferred variant of the process, the first zone may take the form of a conventional tubular cracking furnace. The volume ratio of the two zones determine the ratio of reaction periods (residence time) in these zones. The two reaction zone process could thus also be defined as one in which the reaction time or residence time is at least about two times that in the heated zone.

The minimum 2:1 ratio for the volume of the unheated to heated zone is based on the fact that the benefits of this process are not obtained with ratios less than about 2:1. Better results are obtained at higher ratios in the order of 10:1 or better but lower ratios are satisfactory if the secondary zone contains a catalyst. There is no upper limit to the unheated to heated zone volume ratio from a technical standpoint since in a large zone reactions soon reach completion and the temperature drops to a point at which no further reaction is possible. However, from a practical standpoint a bulky secondary zone is both expensive and undesirable.

The materials of construction for the reaction zones may be any suitable material that is substantially inert to hydrogen chloride and chlorine under the conditions of reaction. Such materials include the nickel-chromium alloy, "Inconel," and glass or glass-lined equipment.

EXAMPLE 1

*Preparation of trichlorethylene*

Tetrachlorethane was vaporized and the vapors were then passed through gas-fired nickel-chromium alloy ("Inconel") tubes in a cracking furnace at the rate of about 650 lbs. per cu. ft. of tube space per hour. The vapors from this heated zone were then passed through an unheated, insulated nickel-chromium alloy, "Inconel," cylinder having a volume 14.5 times that of the heated reaction zone of the cracking furnace. Heat input was controlled so that the temperature of the gases leaving the heated zone was 490° C. The conversion of tetrachlorethane to trichlorethylene under these conditions was 92% of the theoretical with a 0.9% yield of high boiling by-products. A comparative experiment was made without an unheated reaction zone having a volume equivalent to, at least, twice that of the heated zone but with the temperature adjusted to give a comparable 92% conversion to trichlorethylene. In this experiment, it was necessary to increase the heat input so that the gases leaving the heated zone were at a temperature of 520° C. The high boiling by-product yield was then 1.3%. It should be noted that in this experiment the conduit leading from the heated reaction zone to the convertor constituted an unheated reaction zone but this zone had an effective volume less than about twice that of the heated zone.

These tests demonstrate that the two reactor system makes it possible to lower the by-product loss by about 30% and reduces the necessary heat input. This amounts to a considerable saving in the large scale manufacture of chlorethylenes.

EXAMPLE 2

*Simultaneous preparation of trichlorethylene and perchlorethylene*

Tetrachlorethane and crude pentachlorethane were vaporized, mixed with chlorine gas and passed through gas-fired nickel-chromium alloy, "Inconel," tubes in a cracking furnace followed by an unheated "Inconel" reactor as in Example 1. The crude pentachlorethane ranged from 70 to 90% in purity. Results of representative experimental runs A and B, are summarized below.

Run A

In this experiment the heat input to the cracking furnace was adjusted so that the gases leaving the heated reaction zone were at 385° C. The exit gases from the unheated zone were at 370° C. The feed to the heated zone was at a rate of 680 lbs. per cu. ft. of reaction space per hour in the heated tubes. The crude pentachlorethane fed was 87% pure and contained 10% of high boiling by-products plus 3% low boilers, viz. trichlorethylene and perchlorethylene. Table I gives the composition in percent by weight of the gas fed to the heated cracker (Feed), the gas leaving the cracker (1) and the gas leaving the unheated reaction zone (2).

Table I

| Constituent | Feed | Products | |
|---|---|---|---|
| | | #1 | #2 |
| Tetrachlorethane | 80 | 17 | 2 |
| Crude Pentachlorethane | 8 | 12 | 8 |
| Chlorine | 12 | 8 | 3 |
| Trichlorethylene | | 42 | 45 |
| Perchlorethylene | | 6 | 20 |
| Hydrogen Chloride | | 15 | 22 |

Run B

In this experiment the heat input was such that the gases leaving the heated reaction zone were at 430° C. and those leaving the unheated zone were at 402° C. The feed to the heated zone was at a rate of 870 lbs. per cu. ft. of heated reactor space per hour. The crude pentachlorethane was 68% pure and contained 10% high boilers plus 22% low boilers, principally perchlorethylene. Table II summarizes the percent by weight composition of feed gas and gases leaving the heated and unheated reaction zones.

Table II

| Constituent | Feed | Products | |
|---|---|---|---|
| | | #1 | #2 |
| Tetrachlorethane | 78 | 8 | 0.2 |
| Crude Pentachlorethane | 17 | 8 | 7 |
| Chlorine | 5 | 4 | 0.5 |
| Trichlorethylene | | 54 | 51 |
| Perchlorethylene | | 10 | 21 |
| Hydrogen Chloride | | 15 | 20.3 |

These experiments show the importance of the unheated reaction zone in improving chlorine utilization and conversion of tetrachlorethane to chlorinated ethylenes.

We claim:

1. In a process for the production of a chlorinated ethylene product selected from the group consisting of trichlorethylene, perchlorethylene and a mixture of trichlorethylene and perchlorethylene from tetrachlorethane, the improvement comprising passing tetrachlorethane vapor containing zero to about one mole of chlorine per mole of tetrachlorethane sequentially through a heated open-tube reaction zone and an unheated reaction zone, the ratio of the volume of the unheated zone to the heated zone being, at least, about 2 to 1.

2. The process of claim 1 in which a portion of the crude chlorinated reaction product is combined with the vapors passing into the reaction zones.

3. In a process for the production of trichlorethylene from tetrachlorethane, the improvement comprising passing tetrachlorethane vapor sequentially through a heated, open-tube reaction zone followed by an unheated reaction zone, the ratio of the volume of the unheated zone to the heated zone being, at least, 10 to 1.

4. The process of claim 3 in which the vapors leaving the heated zone are maintained at a temperature in the range 350° to 525° C., the ratio of the volume of the unheated zone to the heated zone being, at least, 2 to 1, and the unheated reaction zone contains a packing of particles selected from the group consisting of stainless steel, nickel-chromium alloy, porcelain, charcoal and activated carbon.

5. The process of claim 4 in which a portion of the crude chlorinated reaction product is combined with the vapors passing into the reaction zones.

6. In a process for the production of trichlorethylene and perchlorethylene from tetrachlorethane, the improvement comprising passing tetrachlorethane vapors containing 5 to 15% by weight of chlorine sequentially through a heated, open-tube reaction zone and an unheated reaction zone, the ratio of the volume of the unheated zone to the heated zone being at least 2 to 1.

7. The process of claim 6 in which the unheated reaction zone contains a packing of particles selected from the group consisting of stainless steel, nickel-chromium alloy, porcelain, charcoal and activated carbon.

8. The process of claim 7 in which the vapors leaving the heated zone are at a temperature in the range 350° to 525° C. and a portion of the crude chlorinated reaction product is combined with the vapors passing into the reaction zones.

9. The process of claim 8 in which the portion of the crude chlorinated reaction product combined with the vapors passing into the reaction zone is equivalent to about 10 to 20% by weight of the tetrachlorethane and is principally by-product pentachlorethane.

10. In a process for the production of trichlorethylene and perchlorethylene from tetrachlorethane, the improvement comprising passing a mixture of tetrachlorethane vapor and chlorine containing up to about one mole of chlorine per mole of tetrachlorethane sequentially through a heated open-tube reaction zone in which the vapors are heated to a temperature in the range of 350° to 525° C. and an unheated reaction zone containing a packing of particles selected from the group consisting of stainless steel, nickel-chromium alloy, porcelain, charcoal and activated carbon, the ratio of the volume of the unheated zone to the heated zone being, at least, about 2 to 1.

11. The process of claim 10 in which a portion of the crude chlorinated product is combined with the vapor passing into the reaction zones.

12. The process of claim 11 in which the portion of crude chlorinated reaction product combined with the vapors passing into the reaction zones is equivalent to about 10 to 20% by weight of the tetrachlorethane and is principally by-product pentachlorethane.

13. In a process for the production of a chlorinated ethylene product selected from the group consisting of trichlorethylene, perchlorethylene and a mixture of trichlorethylene and perchlorethylene, the improvement comprising passing tetrachlorethane vapor containing zero to about one mole of chlorine per mole of tetrachlorethane sequentially through a heated open-tube reaction zone and an unheated zone containing a packing of particles selected from the group consisting of stainless steel, nickel-chromium alloy, porcelain, charcoal and activated carbon in which a portion of the chlorinated product is combined with the vapor passing into the reaction zone, the ratio of the volume of the unheated zone to the heated zone being, at least, about 2 to 1.

References Cited in the file of this patent
UNITED STATES PATENTS

| | | |
|---|---|---|
| 2,442,324 | Heitz et al. | May 25, 1948 |
| 2,727,076 | Watten | Dec. 13, 1955 |
| 2,843,638 | Theis et al. | July 15, 1958 |
| 2,859,254 | Eisenlohr | Nov. 4, 1958 |